United States Patent Office 3,226,166
Patented Dec. 28, 1965

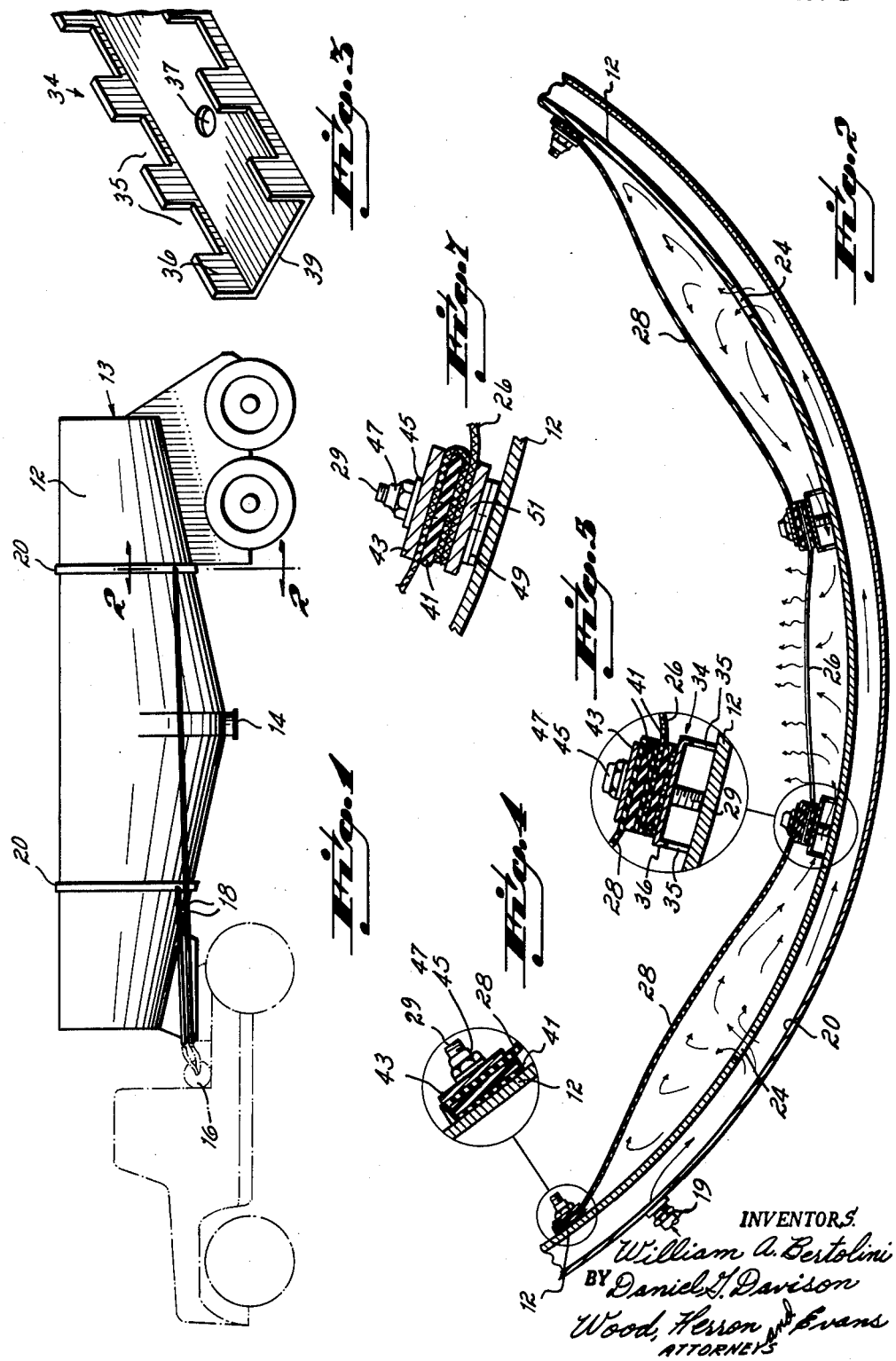

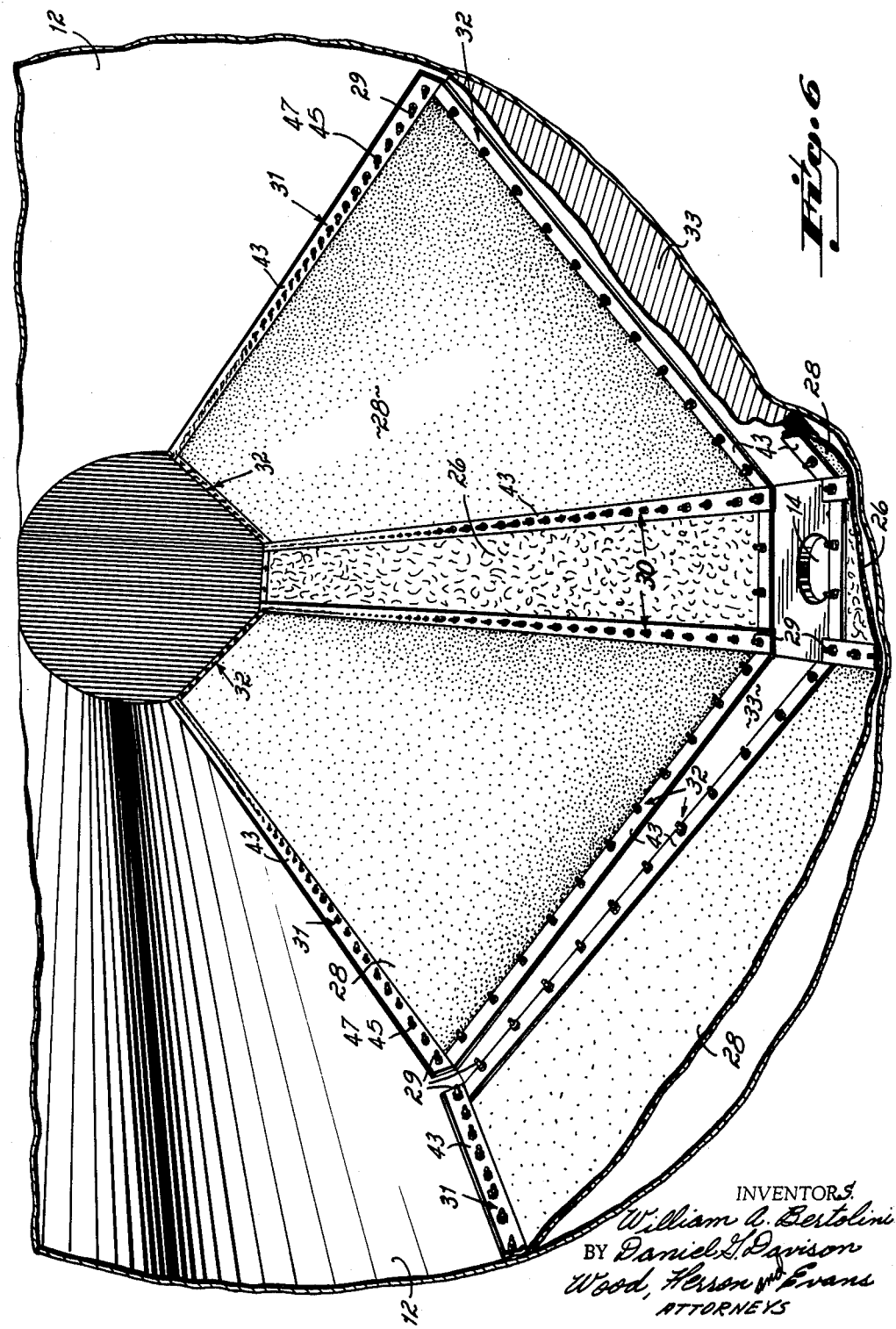

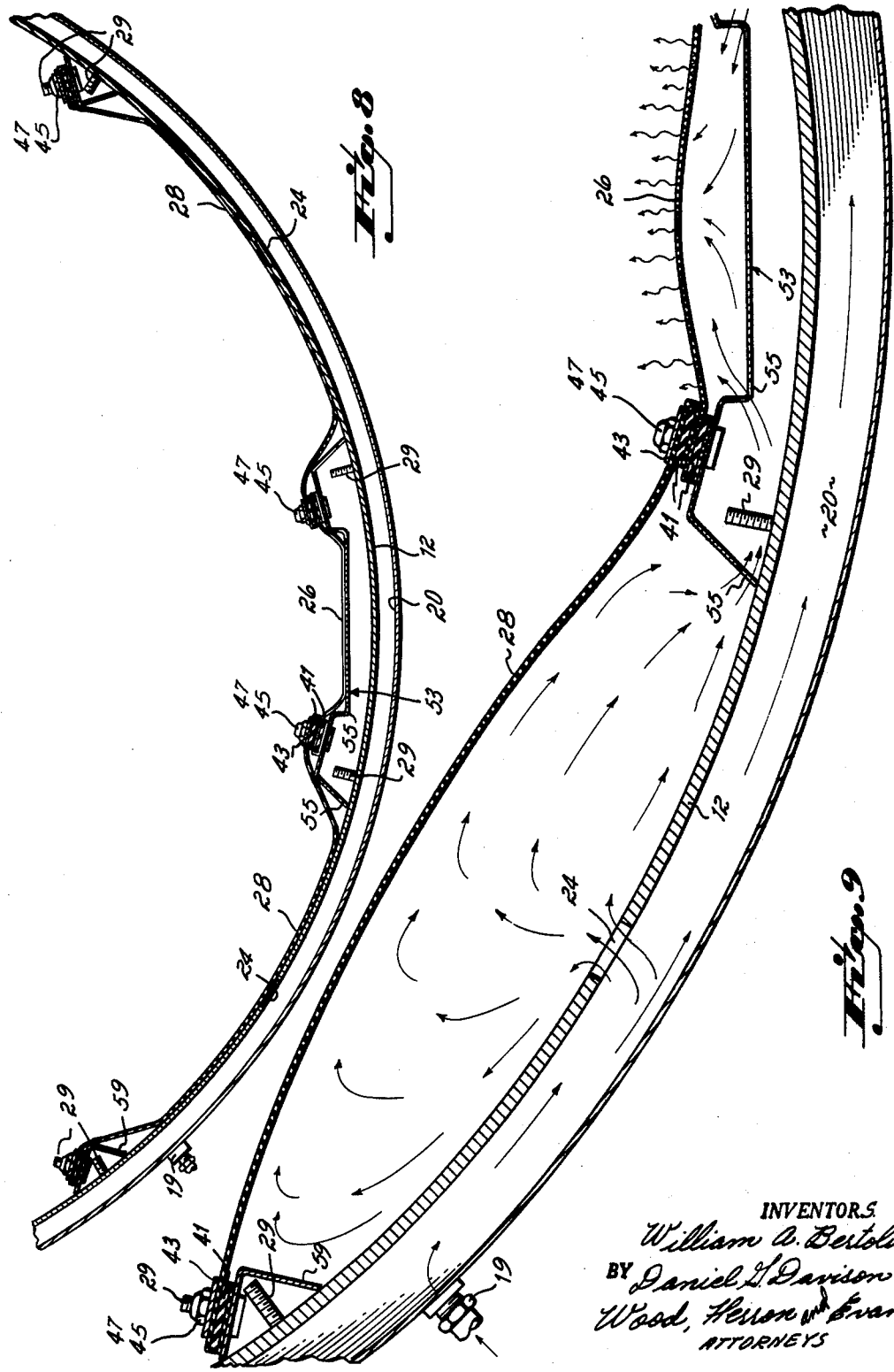

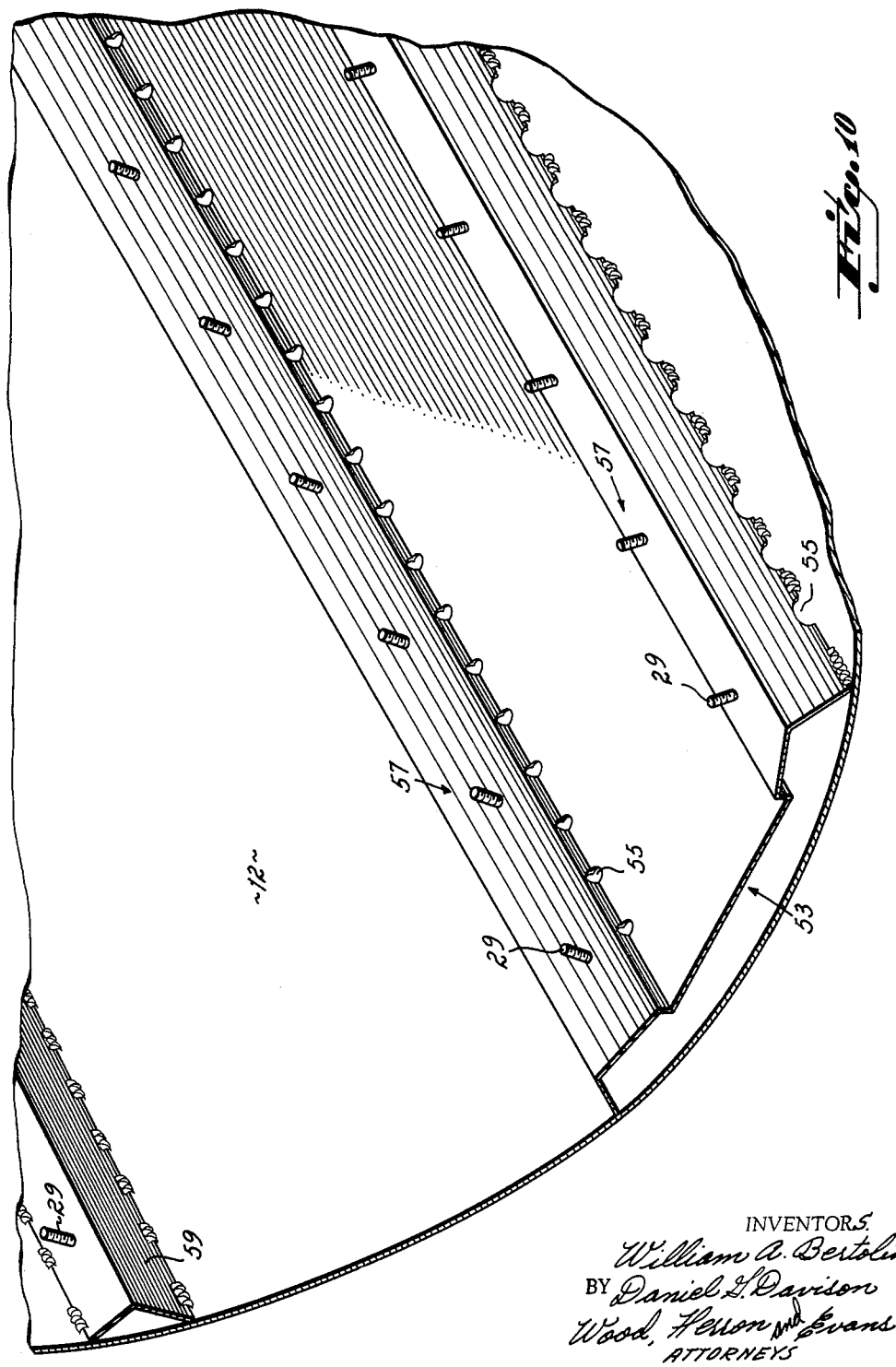

3,226,166
PNEUMATIC APPARATUS FOR HANDLING
PULVERULENT MATERIALS
William A. Bertolini, Cincinnati, Ohio, and Daniel G. Davison, Springfield, Mo., assignors to Pullman Incorporated, Chicago, Ill., a corporation of Delaware
Filed June 9, 1964, Ser. No. 373,691
10 Claims. (Cl. 302—52)

This invention relates to a pneumatic device for unloading pulverulent materials from containers therefor. More particularly this invention is directed to a slope sheet and air slide combination for installation in a tank type trailer vehicle.

For obvious reasons, finely powdered materials, such as cement, lime, powdered clays, various types of chemicals, and many farinaceous materials, must be transported in a tank trailer, that is, a trailer whose cargo body is an enclosed container. In the past, the unloading of particulate materials from enclosed containers was difficult, partly because of the limited area available for employing mechanical unloading equipment. As a solution to many of these unloading difficulties, pneumatic unloading devices were incorporated within the container whereby pulverulent cargoes could be unloaded by suspending the material with streams of air and moving them by gravitational forces while suspended to a discharge outlet.

The type of pneumatic unloading devices to which the present invention is directed include a central air slide that is pervious to air and slope sheets that are air impervious. The central air slide extends longitudinally along the bottom of the container, gradually sloping toward a discharge outlet. The slope sheets extend laterally alongside and are joined to the central air slide and to the sides of the container. In operation, air is introduced between the slope sheets and container. This air balloons the slope sheets outwardly from the sides of the container. Any pulverulent material residing on the slope sheets is displaced toward the central air slide and suspended thereover by air passing upwardly through the air slide. The suspended materials then flow toward the discharge outlet because of the slope of the air slide.

Unfortunately, the type of handling devices just described have not been characterized by their trouble free operation and long operating life. The frequent failures necessitate replacement and this has been a time consuming and difficult task.

The failure of the handling devices has been principally at the junctures of the air slide and slope sheets which have been unable to withstand the billowing of the slope sheets and the forces of the air. Unfortunately, even a small tear in any of these junctures can quite often cause a complete halt to unloading operations since the air that must billow the sheet and suspend the material escapes through the tear before performing its functions.

Our invention has as one of its objectives to provide a simple means for joining slope sheets to an air slide so that the junctures so formed can withstand the forces produced by the continued expansion and contraction of the slope sheets.

Another objective has been the provision of simple and efficient means for joining slope sheets to a container so that the repeated expansions and contractions of the slope sheets will not adversely effect the juncture.

Still another objective of this invention is to provide a means for easily and economically installing in a container a replacement pneumatic handling device of the type previously referred to.

Our invention fulfills the first two objectives since we have provided a pneumatic handling device that is able to withstand the forces that previously caused failures. The objectives have been obtained through the discovery that durable, long lasting junctures can be achieved when the peripheral edges of the slope sheets and alternatively, the edges of the slope sheets and air slides are wrapped around a rubber gasket and the desired junctures formed by clamping. More specifically, it has been found that long lasting junctures can be obtained between an air slide and a slope sheet, when the peripheral edges of at least the slope sheet are wrapped around a rubber gasket and the gasket and edge of the slope sheet are clamped between two flat surfaces with the air slide in between. The junctures so formed are air impervious and can withstand the effects of the frequent stretchings and pullings caused by the billowing of the slope sheets. The durability of these junctures is largely attributable to the rubber gasket and its disposition, and to the clamping. Forces exerted on the junctures by the stretchings and pullings of the slope sheets, and by the materials transported are now more evenly distributed over a larger area in contrast to prior devices wherein these forces were usually concentrated in a few locations.

Additionally, a longer operating life is also characteristic of the junctures so formed because they are less likely to be destroyed by the forces normally tending to pull them away from the studs securing them. Again, this achievement is largely attributable to the rubber gasket that absorbs and distributes the brunt of such forces. For similar reasons, it has been found that a durable juncture of a slope sheet and container can be formed by clamping the peripheral edge of the slope sheets, previously wrapped around a rubber gasket, directly to the container.

Our invention also contemplates, as a means for facilitating the installation of replacement pneumatic handling devices, the replacement of the studs that previously secured the slope sheets and air slide to the container, with channel members having studs secured thereto which can be conveniently positioned in the container directly over the old studs and secured.

The various features and advantages of the present invention will be more clearly apparent to those skilled in the art from the following detailed description taken in conjunction with the drawings in which:

FIG. 1 is a side elevational view of a tank trailer in which the present invention is used, FIG. 2 is a cross sectional view taken along lines 2—2 of FIG. 1 showing one embodiment of the present invention, FIG. 3 is a fragmentary perspective view of an apertured channel, FIG. 4 is a cross sectional view showing the juncture of a slope sheet and a container, FIG. 5 is a cross sectional view showing the juncture of a slope sheet and an air slide and their joinder to a container, FIG. 6 is a perspective view, partly broken away, showing slope sheets and air slides installed in the container shown in FIG. 1, FIG. 7 is a cross sectional view showing still another embodiment of the joinder means shown in FIG. 5, FIG. 8 is a cross sectional view of an alternative embodiment showing the slope sheets in a deflated position, FIG. 9 is a cross sectional view of the embodiment of FIG. 8 showing the slope sheets inflated and billowed outwardly, FIG. 10 is a perspective view of the embodiment of FIG. 8, showing channel members that may be used to secure the air slide and slope sheets to the tank.

Referring now to FIGS. 1–6, the pneumatic handling apparatus our invention is concerned with is shown installed in an enclosed container 12 of a tank trailer 13. The interior and exterior of the container 12 may assume any shape, cylindrical, rectangular, coned, or it may assume the shape of a pair of truncated cones, joined base to base, as does the container 12. Internally, the bottom of the container 12 should slope toward a discharge outlet 14 which may be circular in cross section and provided with any of a variety of conventional valves, not shown, for opening and closing the discharge outlet 14.

The pneumatic handling device is supplied with air by an air source such as a compressor 16. Conveying the air from the compressor 16 to the pneumatic handling device are hoses 18 that each engage a male fitting 19 (FIG. 2) in hollow U-shaped annular ribs 20 that encircle the container 12. The container 12 has openings 24 located at an annular rib 20, below the joinder of the pneumatic handling device to the container walls. The openings 24 cooperate with the male fitting 19 and the hose 18 and permit air to pass to the pneumatic handling device.

A pneumatic handling device for the container 12 shown in FIGS. 1-6 has two air slides 26 and four slope sheets 28. Many containers however would require only one air slide 26 and two slope sheets 28 since their bottoms, unlike the bottom of the container 12, would slope in only one longitudinal direction. For instance, a cylindrical tank sloped toward a discharge outlet at one end would need but one air slide 26 and two slope sheets 28.

The air slides 26 are rectangular in surface area and made from an air pervious material. As installed they extend longitudinally along the bottom of the tank 12, beginning at the end of the container 12 and terminating in front of the discharge outlet 14. The slope sheets 28 are rectangular in surface area and are made from an air impervious material such as a neoprene coated nylon fabric. As installed, they extend laterally alongside the air slides 26.

The present invention relates to the joinder of the air slide and slope sheets to each other and to the container in such a way that the junctures so formed are air impervious and long lasting. Such a juncture is provided through the use of a gasket employed around the peripheral edges of at least one of the surfaces to be joined and the clamping of the surface so prepared to another surface. In this manner a long lasting juncture is formed that is able to withstand the forces attendant the operation of the device.

Referring again to FIGS. 1-6, studs 29 are secured by any suitable means such as welding to the container 12 in four parallel files, two along the bottom and one along each side. The two bottom files 30 are spaced apart a distance approximately equal to the width of the air slide 26. The two side files 31 are each spaced from the bottom files 30 a distance approximately equal to the width of the slope sheet 28. Additionally, four rows 32 of studs 29 extend traversely between the side files 31. The rows 32 are located one at each end and two in the middle of the container 12. The two middle rows 32 are located on each side of the discharge outlet 14 and are secured by conventional means, as by welding, to a yoke 33 that also extends traversely between the side files 31. The bottom of the yoke 33 rests on the bottom of the container and is welded thereto to provide an air tight barrier so that each air slide 26 and cooperating slope sheets 28 may be independently operated. The top surface of the yoke 33 to which the studs are secured is constructed so that three planes of studs 29, one generally horizontal and the other two forming an obtuse angle therewith, are provided in order that the transverse edges of each slope sheet 28 and air slide 26 may engage separate planes of studs. In a similar manner, the rows 32 of studs 29 at either end of the container 12 are located on a yoke, not shown, similar to yoke 33, that supports the other ends of the air slide 26 and slope sheets 28.

Two U-shaped channels 34 having notches 35 in their depending sides 36 and openings 37 in their top surfaces 39 are secured by conventional means, such as welding, to the bottom of the container 12, over the two bottom files 30 of studs 29 so that the studs 29 protrude through the openings 37.

The peripheral edges of the air slides 26 and slope sheets 28 are wrapped or doubled around a gasket 41 that is made from a material such as rubber. An adhesive may be conveniently used to maintain this relationship. Holes, not shown, are provided in the peripheral edges of the air slides 26 and slope sheets 28 and are spaced and arranged in such a manner that they cooperate with the files 30-31, and rows 32 of the studs 29.

The holes in the longitudinal edges of the air slides 26 receive the files 30 of studs 29. Similarly, each file 30 engages a longitudinal edge of a slope sheet 28. In this manner both longitudinal edges of the air slide 26 are supported and received by the channel member 34.

The holes in the transverse edges of the slope sheets 28 and air slides 26 receive the rows 32 of studs 29 and are thereby held in an operational position.

The peripheral edges of the slope sheets 28 and air slides 26 are clamped to either the top surfaces 39 of the channels 34, the container 12, or the yoke 33 by means of metal securing bars 43 that have holes, not shown, which receive the studs 29 permitting the securing bars 43 to rest on the peripheral edges of the slope sheets 28 and the air slides 26. The securing bars 43 are securely held in this position by means of washers 45 that cooperate with the studs 29 and rest on the bars 43, and nuts 47 threaded onto the studs 29 and tightened until they securely engage the washers 45.

Referring now to FIG. 2 which shows the operation of the air slides 26 and slope sheets 28, air supplied by the compressor 16 passes through the hoses 18, the male fittings 19, and into the annular rib 20. The air then passes through the openings 24 into the interior of the container 12 where it billows the slope sheets 28 outwardly. Next it passes below the junctures of the air slides and slope sheets 28, through the notches 35 and up through the air slide 26. In operation, with pulverulent materials in the container, the billowing of the slope sheets 28 causes the material to be displaced toward the air slide 26 where it is suspended by the escaping air and moved by gravitational forces through the discharge outlet 14.

Referring now to FIG. 7, which discloses an alternative embodiment of the invention just described, spacers 49 and flat receiving bars 51 replace the channel member 34 of the previous embodiment. The metal spacers 49 are made from metal and are circular. The spacers have holes, not shown, that receive the studs 29 of the bottom files 30. The diameter of the spacers 49 is such that adjacent spacers in the same bottom file 30 do not abut. The flat receiving bar 51 is made from metal and may be similar to the securing bars 43. Holes, not shown, enable the flat securing bar 51 to receive a bottom file 30 of studs 29 and to lie on the spacers 49. In this manner, the spacers 49 and the bar 51 perform the same functions as the channel member 34.

The embodiment of FIG. 7 also discloses the air tight joinder of a slope sheet 28 with an air slide 26 with the use of gaskets 41 around only the peripheral edges of the slope sheets 28. In this embodiment holes, not shown, in the longitudinal edges of the air slide 26 receive the bottom files 30 of studs 29 and allow the air slide 26 to rest on the bars 51. As in the previous embodiment a slope sheet 28 having a gasket 41 rests on the air slide 26, and the two are securely clamped between the receiving bar 51 by a bar 43, washers 45, and nuts 47.

The remaining junctures formed by the air slide 26, and slope sheets 28 with the container are similar to the ones previously described in relation to the embodiment of FIGS. 1-6. Additionally, the operation of the embodiment of FIG. 7 is similar to the one previously described except that air passes between the spacers 49 instead of through the notches 35.

Referring now to FIGS. 8, 9 and 10, a third embodiment of our invention is disclosed that has as one of its primary objectives the replacement of a pneumatic handling device of the type described without having to remove and replace the pre-existing files 30 and 31 of studs 29. This is partially accomplished through the use of a bottom channel member 53 having approximately the same length as the air slide 26 and constructed so that it may be welded to the bottom of the container 12 over the pre-existing studs. The bottom and sides of the channel member have apertures 55 so that air may circulate beneath the juncture of an air slide and slope sheet which are received and supported by the member 53. On the top of the bottom channel member 53 on two planar surfaces 56, two files 57 of studs 29 are secured as by welding and replace the originally installed bottom files 30. The air slides 26 and slope sheets 28 engage the files 57 of studs 29 in exactly the same way as previously described in the embodiment discussed in FIGS. 2–5. Completing the present embodiment are side channel members 59 that carry studs 29 and which are secured to the container 12 and cover the originally installed side files 31 of studs 29. These side channel members 59 are constructed so that the amount of cargo that they restrain during and after unloading is minimal, that is, their top surfaces are sloped toward the bottom of the container. The slope sheets 28 are clamped to the side channel members 59 in a manner similar to the way they were clamped to the container 12 in the preceding embodiment. The remaining junctures of this embodiment are similar to the preceding ones. The operation of this embodiment is also similar to the preceding ones except that air passing below the juncture of the air slide and slope sheets passes through the apertures 55.

From the above disclosure of the general principles of the present invention and the preceding description, those skilled in the art will readily comprehend various modifications to which the invention is suscepitble. Therefore, we desire to be limited only by the following claims.

Having thus described our invention we claim:

1. A pneumatic handling device for a container for a tank type trailer comprising,
    an air pervious air slide extending along the bottom of said container,
    at least two air impervious slope sheets extending along opposite edges of said air slide,
    a plurality of rubber gaskets, said slope sheet having its peripheral edges wrapped about said rubber gasket,
    means secured to the bottom of said container having upper planar surfaces for receiving said air slide and slope sheets,
    studs engaging said receiving means and extending thereabove,
    passageway means below said upper surfaces providing a flow path for air from under said slope sheet to the under surface of said air slide,
    the adjacent longitudinal edges of said air slide and slope sheets being overlapped and resting on said upper planar surfaces,
    said overlapped edges having holes through which said studs pass,
    a bar engaging said studs and resting on said overlapped edges,
    nuts engaging said studs and tightened so that said overlapped edges are clamped between said bars and said receiving means,
    means air tightly clamping the remaining edges of each slope sheet to said container, and
    means air tightly clamping the remaining edges of said air slide to said container.

2. A pneumatic handling device for the container of a tank type trailer comprising,
    an air pervious air slide extending longitudinally along the bottom of said container,
    at least two air impervious slope sheets extending longitudinally along opposite edges of said air slide,
    a plurality of rubber gaskets, said slope sheet having its peripheral edges wrapped about said rubber gasket,
    means air tightly clamping a peripheral edge of each slope sheet and a rubber gasket embraced thereby to said air slide, said means also securing said air slide and said slope sheets to said container,
    passageway means below said clamping means providing a flow path of air from under said slope sheet to the under surface of said air slide,
    means air tightly clamping a plurality of the remaining edges of each slope sheet to said container, and
    means air tightly clamping the remaining edges of said air slide to said container.

3. A pneumatic handling device for a container for a tank type trailer comprising,
    an air pervious air slide extending longitudinally along the bottom of said container,
    at least two air impervious slope sheets extending laterally along opposite edges of said air slide,
    a plurality of rubber gaskets, said slope sheet having its peripheral edges wrapped around said rubber gaskets,
    two files of studs secured along the bottom of said container and spaced apart a distance approximately equal to the width of said air slide,
    two U-shaped channel members each having an upper planar surface and depending sides, said upper planar surface having openings therein and said depending sides having notches therein,
    each file of said studs protruding through the openings in the planar surfaces of a channel member,
    the adjacent longitudinal edges of said air slide and slope sheets being overlapped and resting on said upper planar surfaces,
    said overlapped edges having holes through which said studs pass,
    a bar engaging said studs and resting on said overlapped edges,
    nuts engaging said studs and tightened so that the peripheral edges of said slope sheets resting on said air slide are clamped between said bars and said channel members,
    means air tightly clamping a plurality of peripheral edges of each slope sheet to said container, and
    means air tightly clamping a plurality of peripheral edges of said air slide to said container.

4. A pneumatic handling device for a container for a tank type trailer comprising,
    an air pervious air slide extending longitudinally along the bottom of said container,
    at least two air impervious slope sheets extending along opposite edges of said air slide,
    a plurality of rubber gaskets, said slope sheets having their peripheral edges wrapped about said rubber gaskets,
    a plurality of studs secured to said container for receiving and securing the peripheral edges of said air slide and slope sheets part of said studs disposed in two parallel files along the bottom of said container, and the remainder disposed in two files along the sides of said container, parallel to said bottom files and on either side thereof, and in a plurality of rows transverse to said files and spaced from each other a distance approximately equal to the length of said air slide,
    two U-shaped channel members disposed longitudinally along the bottom of said container, said members each having an upper planar surface and depending sides, said upper planar surface having openings therein and said depending sides having notches therein, each bottom file of said studs protruding through the openings of a channel member, the adjacent longitudinal edges of said air slide and slope sheets being overlapped and resting on said upper planar surfaces of said U-shaped channel member, said overlapped edges having holes through which said studs pass, the remaining peripheral edges of said air slide and slope sheet having holes through which the remaining studs pass, a plurality of bars, said bars having holes, part of said bars engaging said bottom files of studs and resting on said overlapped edges and the remainer of said bars engaging the remaining studs and resting on the remaining peripheral edges of said air slide and slope sheet, nuts engaging each stud and tightened so that the overlapped edges of said slope sheet and said air slide are clamped between said bars and said channel members, and said remaining peripheral edges are clamped to said container.

5. A pneumatic handling device for a container for a tank type trailer comprising, an air pervious air slide extending longitudinally along the bottom of said container, at least two air impervious slope sheets extending along opposite edges of said air slide, a plurality of rubber gaskets, said slope sheets having their peripheral edges wrapped about said rubber gaskets, a plurality of yokes, said yokes secured transversely to said container and spaced apart a distance approximately equal to the length of said air slide, a plurality of studs for receiving and securing the peripheral edges of said air slide and slope sheets, part of said studs disposed in two parallel files along the bottom of said container and secured thereto, and the remainder disposed in two files along the sides of said container and secured thereto, parallel to said bottom files and on either side thereof, and in a plurality of rows, transverse to said files and secured to said yokes, two U-shaped channel members disposed longitudinally along the bottom of said container, said members each having an upper planar surface and depending sides, said upper planar surface having openings therein and said depending sides having notches therein, each bottom file of said studs protruding through the openings of a channel member, the adjacent longitudinal edges of said air slide and slope sheets being overlapped and resting on said upper planar surfaces of said U-shaped channel member, said overlapped edges having holes through which said studs pass, the remaining peripheral edges of said air slide and slope sheet having holes through which the remaining studs pass, a plurality of bars, said bars having holes therein, part of said bars engaging said bottom files of studs and resting on said overlapped edges and the remainder engaginbg the remaining studs and resting on the remaining peripheral edges of said air slide and slope sheet, nuts engaging each stud and tightened so that the overlapped edges of said slope sheet and said air slide are clamped between said bars and said channel members, and said remaining peripheral edges are clamped to said container and to said yoke.

6. A pneumatic handling device for a container for a tank type trailer comprising, an air pervious air slide extending along the bottom of said container, at least two air impervious slope sheets extending along opposite edges of said air slide, a plurality of rubber gaskets, said slope sheets having its peripheral edges wrapped about said rubber gasket, two files of studs secured along the bottom of said container and spaced apart a distance approximately equal to the width of said air slide, a plurality of circular spacers having openings, said spacers engaging said studs, two receiving bars having apertures in an upper planar surface, said bars each engaging a file of studs and resting on said spacers, the adjacent longitudinal edges of said air slide and slope sheets being overlapped and resting on said upper planar surfaces, said overlapped edges having holes through which said studs pass, a securing bar engaging each file of studs and resting on said overlapped edges, nuts engaging said studs and tightened so that the peripheral edges of said slope sheets and air slide are clamped between said securing bars and said receiving bars, means air tightly clamping a plurality of peripheral edges of each slope sheet to said container, and means air tightly clamping a plurality of peripheral edges of said air slide to said container.

7. A pneumatic handling device for a container for a tank type trailer comprising, an air pervious air slide extending along the bottom of said container, at least two air impervious slope sheets extending along opposite edges of said air slide, a plurality of rubber gaskets, said slope sheets having their peripheral edges wrapped about said rubber gasket, a plurality of studs secured to said container for receiving and securing the peripheral edges of said air slide and slope sheet, part of said studs disposed in two parallel files along the bottom of said container, and the remainder disposed in two files along the sides of said container, parallel to said bottom files and on either side thereof, and in a plurality of rows transverse to said files and spaced from each other a distance approximately equal to the length of said air slide, a plurality of circular spacers having openings, said spacers engaging said bottom files of studs, two receiving bars having apertures in an upper planar surface, said bars each engaging a bottom file of studs and resting on said spacers, the adjacent longitudinal edges of said air slide and slope sheet being overlapped and resting on said upper planar surfaces, said overlapped edges having holes through which said studs pass, the remaining peripheral edges of said air slide and slope sheet having holes through which the remaining studs pass, a plurality of securing bars, said bars having holes, part of said bars engaging said bottom files of studs and resting on said overlapped edges and the remainder of said bars engaging the remaining studs and resting on the remaining peripheral edges of said air slide and slope sheet, nuts engaging each stud and tightened so that the overlapped edges of said slope sheet and said air slide are clamped between said receiving bars and said securing bars, and said remaining peripheral edges are clamped to said container.

8. A pneumatic handling device for a container for a tank type trailer comprising, an air pervious air slide extending along the bottom of said container, at least two air impervious slope sheets extending along opposite edges of said air slide, a plurality of rubber gaskets, said slope sheets having their peripheral edges wrapped about said rubber gasket, a plurality of yokes, said yokes secured transversely to said container and spaced apart a distance approximately equal to the length of said air slide, a plurality of studs for receiving and securing the peripheral edges of said air slide and slope sheet, part of said studs disposed in two parallel files along the bottom of said container and secured thereto, and the remainder disposed in two files along the sides of said container and secured thereto, parallel to said bottom files and on either side thereof, and in a plurality of rows, transverse to said files and secured to said yokes, a plurality of circular spacers having openings, said spacers engaging said bottom files of studs, two receiving bars having apertures in an upper planar surface, said bars each engaging a bottom file of studs and resting on said spacers, the adjacent longitudinal edges of said air slide and slope sheets being overlapped and resting on said upper planar surfaces, said overlapped edges having holes through which said studs pass, the remaining peripheral edges of said air slide and slope sheet having holes through which the remaining studs pass, a plurality of securing bars, said bars having holes, part of said bars engaging said bottom files of studs and resting on said overlapped edges and the remainder of said bars engaging the remaining studs and resting on the remaining peripheral edges of said air slide and slope sheet, nuts engaging each stud and tightened so that the overlapped edges of said slope sheet and said air slide are clamped between said receiving bars and said securing bars, and said remaining peripheral edges are clamped to said container.

9. A pneumatic handling device for a container for a tank type trailer comprising, an air pervious air slide extending along the bottom of said container, at least two air impervious slope sheets extending laterally along opposite edges of said air slide, a plurality of rubber gaskets around which the peripheral edges of said slope sheet are doubled, a channel member extending longitudinally along the bottom of and secured to said container, said channel member having upper planar surfaces spaced apart a distance approximately equal to the width of said air slide and having depending sides having apertures therein, two files of studs secured to said upper planar surfaces and extending upwardly therefrom, the adjacent longitudinal edges of said air slide and slope sheets being overlapped and resting on said upper planar surfaces, said overlapped edges having holes through which said studs pass, a bar engaging each file of studs and resting on said overlapped edges, nuts engaging said studs and tightened so that said overlapped edges are clamped between said bars and said channel member, means air tightly clamping a plurality of peripheral edges of each slope sheet to said container, and means air tightly clamping a plurality of peripheral edges of said air slide to said container.

10. A pneumatic handling device for a container for a tank type trailer comprising, an air pervious air slide extending along the bottom of said container, at least two air impervious slope sheets extending laterally along opposite edges of said air slide, a plurality of rubber gaskets around which the peripheral edges of said sheet are doubled, a channel member extending longitudinally along the bottom of and secured to said container, said channel member having upper planar surfaces spaced apart a distance approximately equal to the width of said air slide, and having depending sides having apertures therein, a yoke secured to said container at each end of said air slide, two side channel members secured to the sides of said container, a plurality of studs, said studs secured to said yokes, side channel members, and said upper planar surfaces, the adjacent longitudinal edges of said air slide and slope sheets being overlapped and resting on said upper planar surfaces, the remaining longitudinal edges of said slope sheet resting on said side channel members, all of said longitudinal edges having holes through which studs pass, the transverse edges of said air slide and slope sheets resting on said yokes, said edges having holes through which studs pass, a plurality of bars engaging said studs and covering the peripheral edges of said slope sheets and air slide, and nuts engaging said studs and tightened against said bars.

No references cited.

SAMUEL F. COLEMAN, *Primary Examiner.*